(12) United States Patent
Barkdull et al.

(10) Patent No.: US 10,286,899 B2
(45) Date of Patent: May 14, 2019

(54) OPERATION OF POWER ELECTRONICS DURING BATTERY COMMUNICATION LOSS

(71) Applicant: Ford Global Technologies, LLC, Dearborn, MI (US)

(72) Inventors: Trent Barkdull, Livonia, MI (US); William David Treharne, Ypsilanti, MI (US); Jonathan Andrew Butcher, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 53 days.

(21) Appl. No.: 15/353,270

(22) Filed: Nov. 16, 2016

(65) Prior Publication Data
US 2018/0134279 A1 May 17, 2018

(51) Int. Cl.
*B60W 20/13* (2016.01)
*B60W 20/50* (2016.01)
(Continued)

(52) U.S. Cl.
CPC ........... *B60W 20/50* (2013.01); *B60L 3/0046* (2013.01); *B60L 3/12* (2013.01); *B60L 11/1811* (2013.01); *B60L 11/1861* (2013.01); *B60W 20/13* (2016.01); *B60L 2210/30* (2013.01); *B60L 2210/40* (2013.01); *B60L 2240/429* (2013.01); *B60L 2240/54* (2013.01); *B60W 2510/244* (2013.01); *B60Y 2300/69* (2013.01); *B60Y 2306/13* (2013.01); *B60Y 2400/112* (2013.01);
(Continued)

(58) Field of Classification Search
CPC ................. B60W 20/50; B60W 20/13; B60W 2510/244; B60Y 2300/69; B60Y 2306/13; B60Y 2400/113; B60L 11/1861; B60L 2210/10; B60L 2240/429; Y10S 903/907
See application file for complete search history.

(56) References Cited

U.S. PATENT DOCUMENTS 6,356,083 B1 * 3/2002 Ying .................... G01R 31/361
    324/426
8,860,348 B2 * 10/2014 Savagian .............. B60L 11/005
    318/432
(Continued)

FOREIGN PATENT DOCUMENTS

KR     20130088910 A     8/2013

OTHER PUBLICATIONS

Meisel et al., A Practical Control Methodology for Parallel Plug-In Hybrid Electric Vehicle Powertrains, 2013, IEEE, p. 30-35 (Year: 2013).*

(Continued)

Primary Examiner — McDieunel Marc
(74) Attorney, Agent, or Firm — David B. Kelley; Brooks Kushman P.C.

(57) ABSTRACT

A vehicle includes a battery control module and a controller. The battery control module is configured to issue at regular intervals a message indicative of a state of charge (SOC) of a battery. The controller is configured to, in an absence of receiving the messages at the regular intervals while in a key-on state and a torque demand is present, restrict power flow between the battery and an electric powertrain to a limit that is based on a predicted SOC to provide limited propulsive force.

10 Claims, 4 Drawing Sheets

(51) Int. Cl.
*B60L 11/18* (2006.01)
*B60L 3/00* (2019.01)
*B60L 3/12* (2006.01)

(52) U.S. Cl.
CPC ........ *Y02T 10/7005* (2013.01); *Y02T 10/7044* (2013.01); *Y02T 10/7241* (2013.01); *Y02T 10/7275* (2013.01); *Y02T 90/16* (2013.01); *Y10S 903/907* (2013.01)

(56) References Cited

U.S. PATENT DOCUMENTS

| | | | | |
|---|---|---|---|---|
| 9,114,709 | B2* | 8/2015 | Stanek | B60L 1/003 |
| 9,573,483 | B2* | 2/2017 | Choi | B60L 11/1862 |
| 2007/0012492 | A1* | 1/2007 | Deng | B60K 6/26 |
| | | | | 180/65.1 |
| 2011/0066308 | A1* | 3/2011 | Yang | B60W 20/11 |
| | | | | 701/22 |
| 2011/0273135 | A1* | 11/2011 | Sano | H02J 3/32 |
| | | | | 320/101 |
| 2013/0221741 | A1* | 8/2013 | Stanek | B60L 1/003 |
| | | | | 307/9.1 |
| 2014/0062348 | A1* | 3/2014 | Isayeva | B60L 3/0061 |
| | | | | 318/139 |
| 2014/0062349 | A1* | 3/2014 | Isayeva | B60K 6/445 |
| | | | | 318/139 |
| 2015/0197163 | A1* | 7/2015 | Loftus | B60L 11/1809 |
| | | | | 320/134 |
| 2016/0111990 | A1* | 4/2016 | Books | B60L 11/02 |
| | | | | 322/23 |
| 2016/0250927 | A1* | 9/2016 | Wang | B60L 1/003 |
| | | | | 307/10.1 |
| 2017/0102434 | A1* | 4/2017 | Wenzel | H02J 3/32 |
| 2017/0129359 | A1* | 5/2017 | Dunlap | B60L 11/1861 |
| 2018/0056790 | A1* | 3/2018 | Symanow | B60K 6/448 |
| 2018/0273021 | A1* | 9/2018 | Morimoto | B60K 6/442 |
| 2018/0312158 | A1* | 11/2018 | Morimoto | B60W 20/14 |

OTHER PUBLICATIONS

Ambuhl et al., Predictive Reference Signal Generator for Hybrid Electirc Vehicles.. 2009, IEEE, p. 4730-4740 (Year: 2009).*
Murphey et al., Intelligent Hybrid Vehicle Power Control.. 2012, IEEE, p. 69-79 (Year: 2012).*
Chen et al., Energy Management for a Power Split Plug in Hybrid Electric Vehicle.. 2013, IEEE, p. 1567-1580 (Year: 2013).*

* cited by examiner

OPERATION OF POWER ELECTRONICS DURING BATTERY COMMUNICATION LOSS

TECHNICAL FIELD

This application is generally related to a power electronics module configured to operate during a loss of communication event between a traction battery controller and the power electronics module.

BACKGROUND

Electrified vehicles including hybrid-electric vehicles (HEVs) and battery electric vehicles (BEVs) rely on a traction battery to provide power to a traction motor for propulsion and a power inverter there in-between to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery wherein a terminal voltage of a typical traction battery is over 100 Volts DC. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, which may include a traction motor and a generator, may require high voltage and high current. Due to the voltage and current requirements, a battery module and a power electronics module are typically in continuous communication. The battery module provides critical information for the vehicle control algorithms including battery voltage, battery current, and battery state-of-charge (SOC).

SUMMARY

A vehicle includes a battery control module and a controller. The battery control module may be configured to issue at regular intervals a message indicative of an SOC of a battery. The controller may be configured to, in an absence of receiving the messages at the regular intervals while in a key-on state and a torque demand is present, restrict power flow between the battery and an electric powertrain to a limit that is based on a predicted SOC to provide limited propulsive force.

A method of controlling an electric powertrain includes, in response to an absence of a state of charge (SOC) value of a battery broadcast by a battery module at a periodic interval, limiting net power flow of the electric powertrain and diverting power between an accessory high-voltage load and the electric powertrain. The limiting of the net power flow of the electric powertrain is to maintain the SOC value to within a predetermined range that is based on a predicted SOC value of the battery. The diverting of power between an accessory high-voltage load and the electric powertrain is such that a change in power flow is minimized.

A powertrain module includes a controller that may be configured to, in an absence of receiving a message indicative of an SOC of a battery at a regular interval while in a key-on state and a driver torque demand is present, output a command to divert power from an accessory high-voltage load to an electric machine such that a change in power flow with the battery is minimized.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Solid state devices (SSD), such as Insulated Gate Bipolar junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 1:
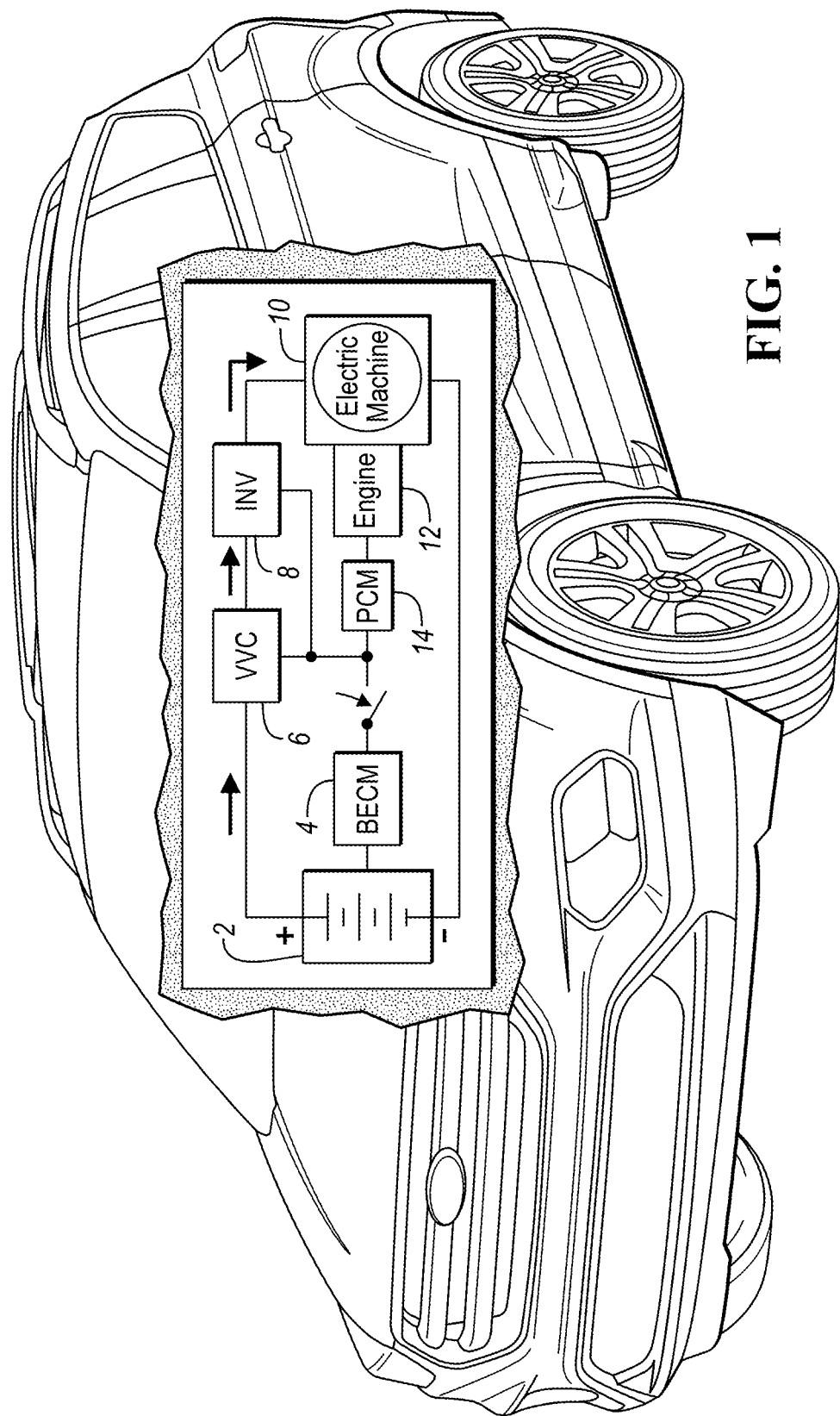
FIG. 1 is a diagram of a hybrid vehicle illustrating operation during a loss of communication event between a battery controller and a power electronics module.

FIG. 1 depicts a hybrid electric vehicle illustrating internal electric powertrain components configured to maintain operation with a loss of communication between a battery electric control module (BECM) and other vehicular modules such as a powertrain control module (PCM), an inverter control module (ICM), a variable voltage converter (VVC), or other module. Here, a traction battery 2 is coupled with and controlled by a BECM 4. The BECM 4 is typically in communication with a VVC 6, Power inverter 8, powertrain control module (PCM) 14, and other vehicular modules via a data bus. The data bus may be a Controller Area Network (CAN) bus, a Flexray bus, an Ethernet Bus, or other common bus system. Also, the battery 2, is coupled with the VVC 6, Inverter 8, and electric machine 10, and configured to provide propulsive force to the vehicle. Generally, electric modules such as the VVC 6, inverter 8, and PCM 14 maintain communication with the BECM 4, via sending and receiving messages over the communication bus. The sending and receiving of messages occur at a regular interval. The regular interval may be periodic, semi-periodic, or within a specific timeframe, For example, a module may be configured to operate with a 2 millisecond control loop, and the BECM may be configured to transmit battery characteristics such as a state of charge (SOC) of the battery 2, a temperature of the battery 2, a voltage of the battery 2, a current flowing from the battery 2, a number of cycles that battery 2 has had, an age of the battery 2, and other characteristics. Typically, in response to the BECM 4 transmitting a battery characteristic on the communication bus, other modules respond to the message by transmitting operational characteristics of their respective module. For example, the VVC 6 may transmit an input voltage, an output voltage, an input current, an output current, an operation frequency, or other characteristic. In the event of a loss of communication, the BECM 4 may or may not open main contactors depending on vehicle conditions. Opening battery main contactors would disconnect the battery 2 from the VVC, 6, inverter 8, and electric machine 10, thereby allowing the vehicle to operate in a mode in which the vehicle is propelled by the engine 12 that is controlled by the PCM 14. Also, the VVC 6 may shut down by opening internal switches including a high side pass switch and a low side charge switch, thereby disconnecting the battery voltage bus from the high-voltage DC bus used to drive the inverter 8. In general, communication messages may be on a synchronous or asynchronous bus and the loss of communication may include a total loss of data on the communication bus, a partial loss of data on the communication bus, or errored data on the communication bus. For example, with a synchronous bus (e.g., Flexray, Ethernet Time-Sensitive Networking 'Ethernet TSN'), the message may be assigned a specific timeslot and a loss of communication may be an empty frame during the timeslot.

Figure 2:
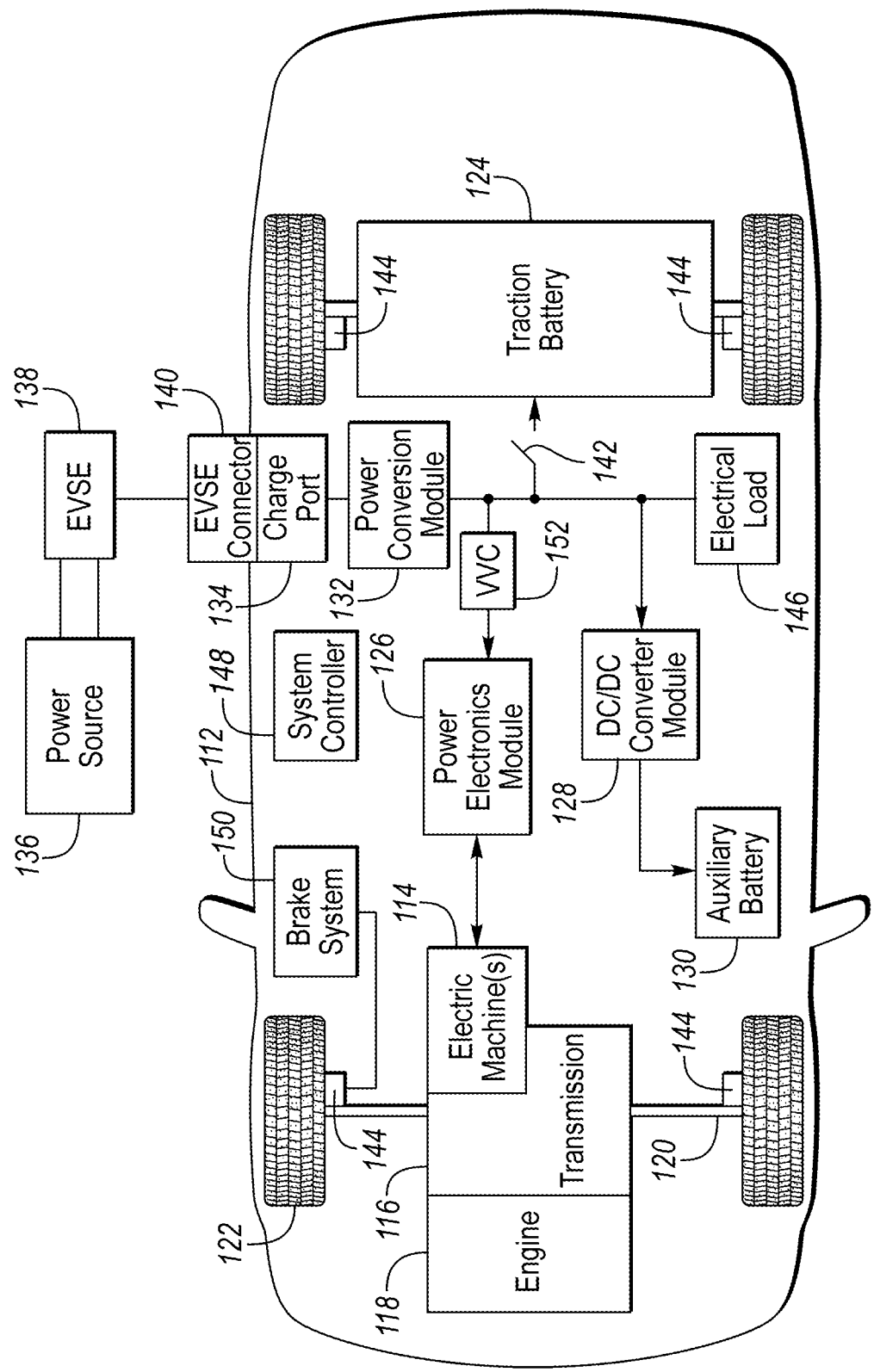
FIG. 2 is a diagram of a hybrid vehicle illustrating typical drivetrain and energy storage components including a variable voltage converter and power electronics module.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. Other types of electrical vehicles 112 that are applicable to this disclosure include other vehicles with a secondary source of power including fuel cell vehicles. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The lines shown coupling the traction battery via the contactors 142 may be representative of two conductors carrying a positive and a negative voltage. The main contactors 142 may be two contactors including a positive contactor and a negative contactor, in some embodiments, the main contactors 142 includes three contactors being a positive contactor, a negative contactor, and a pre-charge contactor. A voltage of the traction battery is referred to as a bus voltage and is shown coupled with modules including Variable Voltage Converter 152, Power Conversion Module 132, and High Voltage DC Electric Loads 146. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be configured to measure the bus voltage at the input to the VVC 152. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more low voltage electrical loads (not shown) may be coupled to the auxiliary battery 130. One or more high voltage electrical loads 146 may be coupled to the high-voltage bus. The electrical loads 146 may have an associated controller that operates and controls the electrical loads 146 when appropriate. An example of an electrical load 146 is a passenger thermal control system that may include a high-voltage fan, a high-voltage electric heating element, and/or a high-voltage air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
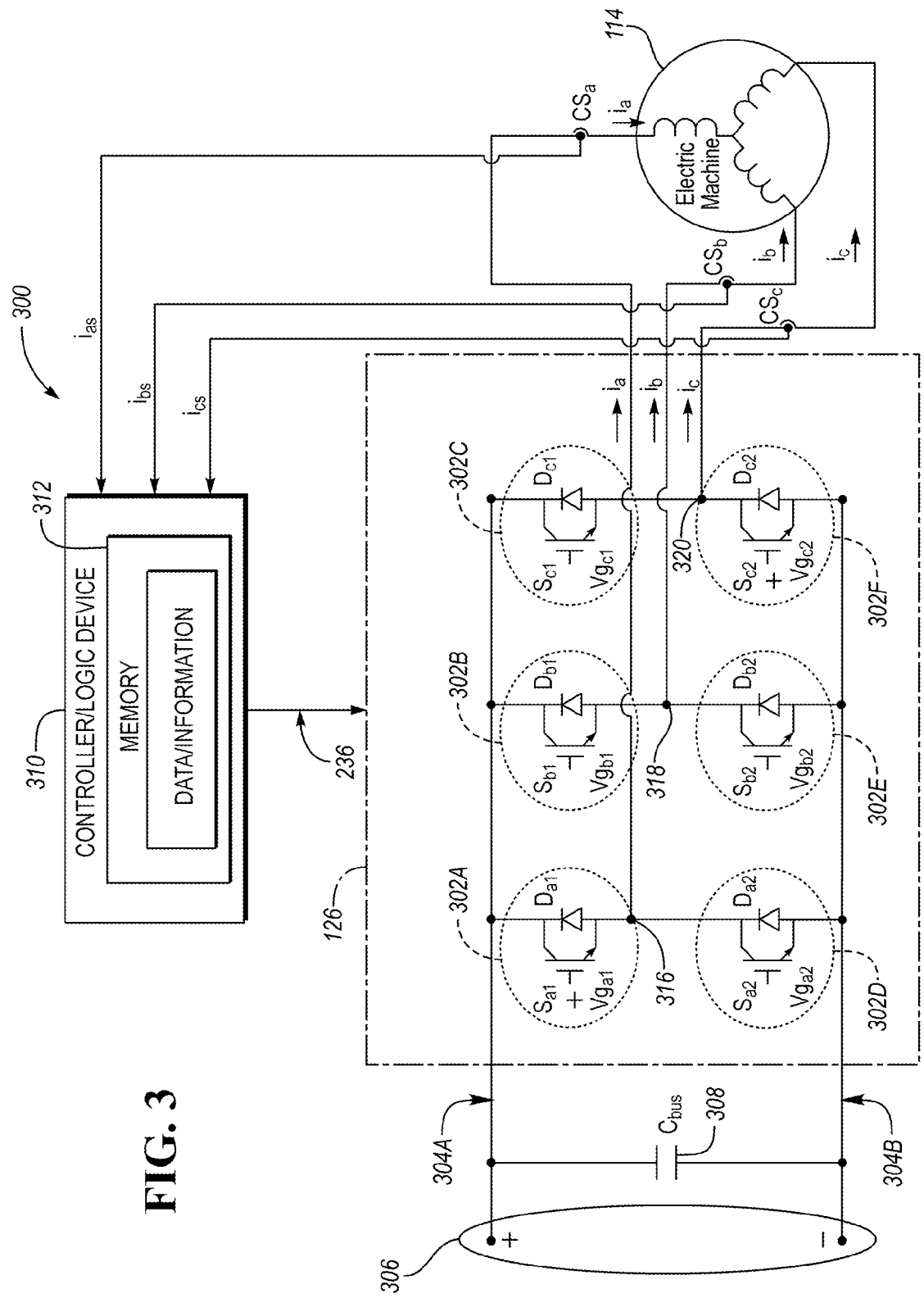
FIG. 3 is a schematic diagram of a power inverter of a power electronics module.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and is to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM 126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 2: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Figure 4:
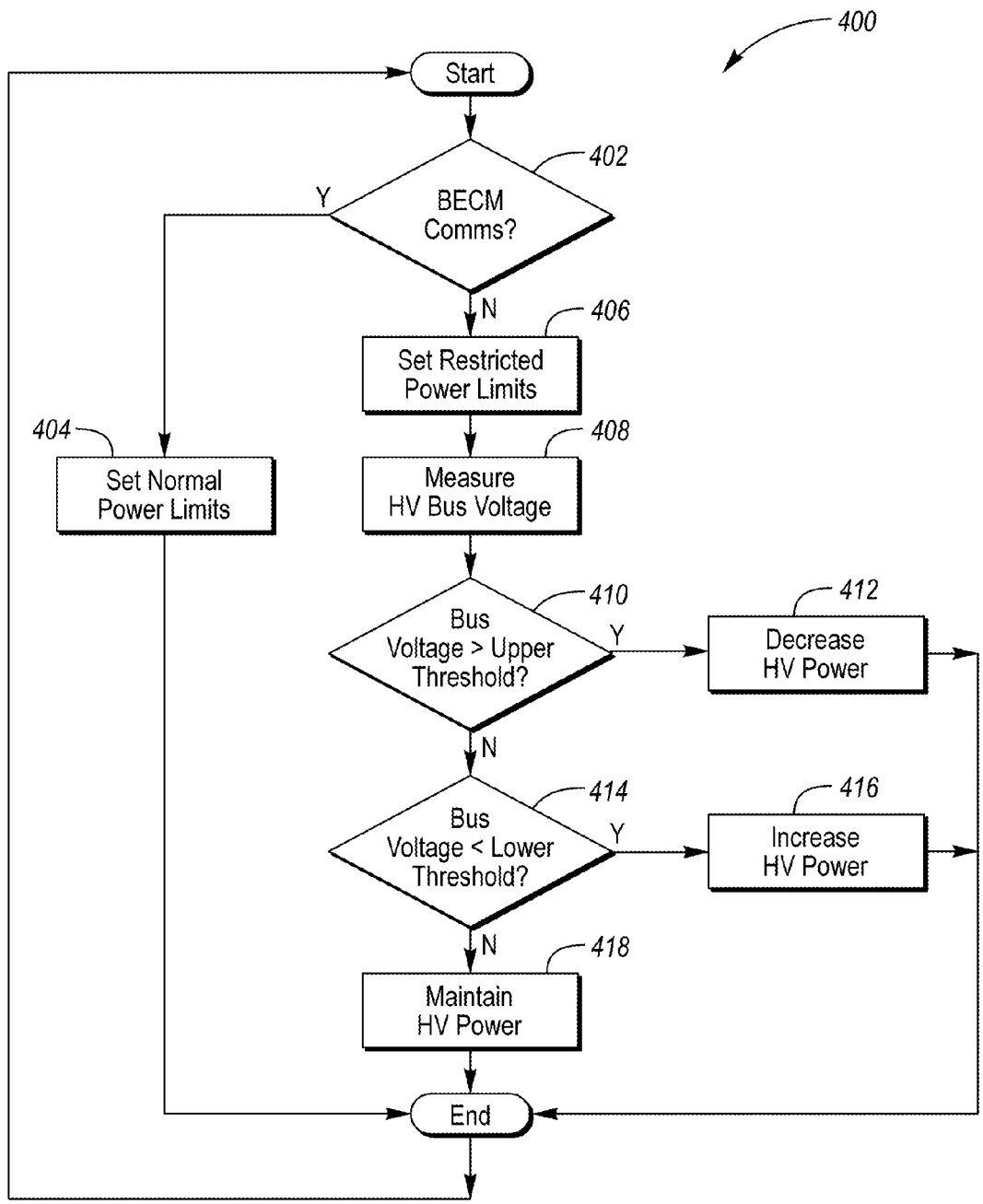
FIG. 4 is a flow diagram of a vehicle power control algorithm used in response to a particular failure mode such as a loss of communication event with battery control module.

FIG. 4 is a flow diagram of a vehicle power control algorithm 400. In operation 402, the vehicle system controller branches based on communication with a battery electric control module (BECM). If the controller receives messages from the BECM at a regular interval, the controller branches to operation 404. In operation 404, the controller sets power limits to normal operational power limits based on a vehicle configuration and operational conditions (e.g., ambient temperature, current SOC of the battery, power demand, and navigation data. As described above, a regular interval includes a periodic, or semi-periodic message reception. Also, a regular interval includes a reception within a specific time range. For example, the controller may be configured to receive a message within at least 20 milliseconds, therefore if more than 20 milliseconds expires after the last received message, the controller will operate in a loss of communication mode. In the event a message is received after entering the loss of communication mode, the controller will revert back to normal operation.

If the controller does not receive messages from the BECM at the regular interval, the controller branches to operation 406. In operation 406, the controller will restrict power limits based on predicted characteristics including a predefined bus voltage versus a high voltage battery state of charge relationship to predict the SOC of the battery and a predicted temperature of the battery. The predicted characteristics may be derived, by the vehicle system controller, from a last received value or a group of last received values of battery characteristics, a time associated with the last received value(s), and a power usage measured or calculated by the module. For example, the vehicle system controller may have received a message from a BECM at a regular time interval t1, after which the vehicle system controller does not receive another message from the BECM at the next regular time interval t2. The vehicle system controller may then predict the battery characteristics based on the last received message at time t1, the current time t3, and power used by the module. In one embodiment, a time integral over the time period t1-t3, may be performed on the power received by the inverter or VVC from the traction battery. As Power equals voltage multiplied by current (P=V·I) which equals joules per second (J/sec), the time integral of power is energy and the change in energy used by the module may be used to provide a change in battery SOC from the value at the starting point t1. The restrictions on the power limits may include reducing the propulsive force available for the electric machine or turning off other high-voltage systems including an Air Conditioning (A/C) Compressor Control Module (ACCM) or other Positive Temperature Control (PTC) electric cabin heater. After completing operation 406, the controller proceeds to operation 408. Generally, the measuring of the bus voltage is performed at the input to the VVC 152, however in other embodiments may measure the bus voltage at the high voltage inputs to high voltage electric loads 146. For example, high voltage electric loads 146 including an A/C compressor, an Electric Power Steering, and a Power Conversion Module 132 may be used to measure the bus voltage. The bus voltage may also be referred to as a traction battery voltage and is input to the VVC 152, a boost voltage is the output of the VVC 152 and input to the inverter or PEM 126.

In operation 408, the controller measures the voltage of the high-voltage bus. The high-voltage bus is the bus that is coupled with the power inverter that is used to drive the electric machine. Once a vehicular module such as a PCM or an inverter module enters into a loss of communication mode, the module may monitor the High-voltage bus more frequently or may maintain the rate at which the high-voltage bus is monitored and proceed to operation 410.

In operation 410, the controller branches based on the voltage of the high-voltage bus. If the voltage of the high-voltage bus is greater than an upper threshold, such as a predetermined value based on the last known battery temperature and a percentage of maximum allowable battery pack voltage, the controller branches to operation 412. If the voltage of the high-voltage bus is less than the upper threshold, the controller will branch to operation 414.

In operation 412, the vehicle system controller will change the system operation to decrease the power on the high-voltage bus. The high-voltage bus power may be decreased in a variety of ways, including but not limited to decreasing the amount of electrical energy being generated by the electric machine (generator), starting to consume electrical energy from the HV bus with the electric machine (motor and/or generator), or increasing accessory high-voltage loads such as the air conditioning compressor or 12V DC-DC converter. All of these actions will result in the gradual discharge of the battery, which will eventually cause bus voltage to fall below the predetermined upper threshold. The predetermined upper threshold is calculated to ensure that long term (more than several hours, less than one continuous day) usage of the battery will not result in the battery state of charge reaching a level that could cause damage to the battery cells and not result in the need to disconnect the battery from the vehicle while driving. Disconnecting the battery while driving can have several negative side effects including loss of 12V DC-DC converter, which will lead to eventual 12V battery depletion, and loss of vehicle function. In operation 414, the controller branches based on the voltage of the high-voltage bus. If the voltage of the high-voltage bus is less than a lower threshold, such as a predetermined value based on the last known battery temperature and minimum allowable battery pack voltage, the controller branches to operation 416. If the voltage of the high-voltage bus is greater than the lower threshold, the controller will branch to operation 418.

In operation 416, the vehicle system controller will change the system operation to increase the power of the high-voltage bus. The high-voltage bus power may be increased in a variety of ways, including but not limited to increasing an amount of electrical energy being generated by the electric machine (generator), inhibiting consumption of electrical energy from the HV bus with the electric machine (motor and/or generator), or decreasing/inhibiting accessory high-voltage loads such as the air conditioning compressor or 12V DC-DC converter. All of these actions will result in the gradual charge of the battery, which will eventually cause the bus voltage to increase above the predetermined lower threshold. The predetermined lower threshold is calculated to ensure that usage of the battery will not result in the battery state of charge reaching a level that could cause damage to the battery cells and not result in the need to disconnect the battery from the vehicle while driving.

In operation 418, the vehicle system controller will control the vehicle systems to maintain the voltage of the high-voltage bus based on a predicted battery characteristics including the predicted SOC, the predicted battery temperature, and a power demand of the vehicle propulsion system and high voltage accessories, such as the DC/DC converter. The vehicle control system will limit the energy usage of the High-voltage bus to be as close to a net-zero change over time as possible. There are several strategies that may be used to affect this "charge neutral" behavior that may include running the engine continuously to allow full use of the electric machine's ability to either generate or consume electric power. Once the full use of the electric machine is achieved, the torque command to the electric machine can be simply determined to be, that which produces enough power to satisfy the high-voltage accessory loads and other parasitic losses. The high voltage accessories may provide an estimate as to their current power consumption, which is used to estimate the power demand. There are also losses in the electric machines themselves and in the high voltage wiring, called parasitic losses. These losses can be estimated, using algorithms or look-up tables versus their operating state, and be added to the power commanded to be generated. The result of this should be a net-zero battery current draw, with some allowances for errors in estimating the different powers in the system.

The system may also limit the maximum allowable battery charge or discharge power to a smaller magnitude than under similar non-faulted conditions, ensuring that any errors in battery power estimation remain small. In this manner, the SOC of the battery should be effectively maintained within values that correspond to the Upper Voltage Threshold of Operation 410, and Lower Voltage Threshold of Operation 414. Due to the natural integration of small errors over long periods of time (several hours for example), it is expected that even though the Vehicle system controller is attempting to remain energy neutral in its usage of the high-voltage battery, the real energy usage from the battery can drift significantly. When this eventually occurs, the bus voltage will naturally rise or fall over time, resulting in the periodic logic taking branch 412, or 416, but mostly taking branch 418. The characteristic relationship of battery SOC and voltage, that is particular to the battery chemistry employed, allows the strategy to estimate battery SOC by measuring the battery pack voltage.

In parallel with the logic represented in FIG. 4, the BECM will have detected the loss of communication with the vehicle system controller, just as the vehicle system controller detected a loss of communication with the BECM. The BECM is the control module with final control over the high-voltage contactors (e.g., those mechanical switches that connect the battery to the rest of the high-voltage bus), and ultimate authority to protect the battery hardware from misuse by the vehicle control system. If the contactors were open when the loss of communication occurred, the BECM may be configured to keep them open indefinitely, unless the communication resumes. If the contactors were closed when the loss of communication occurred, the BECM may be configured to keep the contactors closed for the duration of the vehicle drive cycle (until key-off), assuming the BECM can detect a vehicle power down event (key-off event), or some other mechanism is used to open the HV contactors at vehicle power down. It is also a desirable ability for the vehicle control system to be able to force the battery contactors open in the event of some emergency event that cannot be communicated to the BECM (due to loss of network communication). So if the BECM can detect a vehicle power down event, and can have its contactors opened by the vehicle control system in an emergency situation, then it can continue to keep its contactors closed in the event of a loss of communication without exposing the vehicle to additional risk by doing so. It is this ability to keep the contactors closed, and keep the HV battery connected to the vehicle, that allows for continued vehicle functionality for an indeterminate amount of time. Failing to keep the contactors closed can significantly reduce vehicle functionality in some hybrid powertrain architectures. Specifically the ability to keep the 12V battery charged is of critical importance to maintaining vehicle operation. This flowchart provides a structure for the electric powertrain to limit the power generation and consumption of the system to maintain the SOC value of the battery within a predetermined range. Also, a net power flow of the battery is based on either power generation and/or power consumption by the electric powertrain.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling an electric powertrain comprising:
    in response to an absence of a state of charge (SOC) value of a battery broadcast by a battery module at a periodic interval,
    limiting net power flow of the electric powertrain to maintain the SOC value to within a predetermined range that is based on a predicted SOC value of the battery,
    diverting power between an accessory high-voltage load and the electric powertrain such that a change in power flow is minimized, and
    commanding an electrical generating machine torque of the electric powertrain at an angular speed to a power equal to provide power propulsion demand and parasitic losses of the electric powertrain to diminish a change in net battery power.

2. The method of claim 1, wherein the predicted SOC value is based on a last received message, a period starting from the last received message to a present time, and a time integral of a power of a high-voltage bus between the battery and an electric machine over the period.

3. The method of claim 1, wherein diverting power between the electric powertrain and the accessory high-voltage load is, in response to an increase in power demand by the electric powertrain, diverting power from an accessory high-voltage load to the electric powertrain such that a change in power flow is minimized.

4. The method of claim 1, wherein limiting a torque of an electric machine includes limiting a propulsive force available from the electric machine.

5. A vehicle comprising:
    a controller configured to,
        responsive to absence of a message indicative of an SOC of a battery received at a regular interval while in a key-on state and driver torque demand is present, divert power from a load, and
        generate torque of an electric machine at a speed to provide power equal to a propulsion demand and parasitic losses of the electric powertrain to diminish a change in battery power.

6. The vehicle of claim 5, wherein the controller is further configured to, upon reception of messages after the absence, output a command to restore the power to the load.

7. The vehicle of claim 5, wherein the controller is further configured to restrict power flow between the battery and the electric machine to a limit that is based on a predicted SOC to provide limited propulsive force.

8. The vehicle of claim 7, wherein the controller is further configured to, upon reception of messages after the absence, output a command to restore the power flow between the battery and electric machine.

9. The vehicle of claim 7, wherein restricting power flow between the battery and an electric machine by the controller includes diverting power from the load to the electric machine such that a change in power flow with the battery is minimized.

10. The vehicle of claim 7, wherein the predicted SOC of the battery is based on a bus voltage and bus current measured by a power inverter.

* * * * *